United States Patent
Jiang et al.

(10) Patent No.: US 10,404,970 B2
(45) Date of Patent: Sep. 3, 2019

(54) DISPARITY SEARCH RANGE COMPRESSION

(71) Applicant: INTEL CORPORATION, Santa Clara, CA (US)

(72) Inventors: Yong Jiang, Shanghai (CN); Yi Wu, San Jose, CA (US); Richmond Hicks, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 15/128,087

(22) PCT Filed: Nov. 16, 2015

(86) PCT No.: PCT/CN2015/094693
§ 371 (c)(1),
(2) Date: Sep. 21, 2016

(87) PCT Pub. No.: WO2017/084009
PCT Pub. Date: May 26, 2017

(65) Prior Publication Data
US 2017/0272727 A1    Sep. 21, 2017

(51) Int. Cl.
*H04N 13/271*    (2018.01)
*H04N 13/128*    (2018.01)
*G06K 9/46*    (2006.01)
*G06T 7/00*    (2017.01)
*H04N 13/00*    (2018.01)

(52) U.S. Cl.
CPC ......... *H04N 13/271* (2018.05); *G06K 9/4638* (2013.01); *G06T 7/97* (2017.01); *H04N 13/128* (2018.05); *H04N 2013/0081* (2013.01)

(58) Field of Classification Search
CPC ...... H04N 13/271; H04N 13/128; G06T 7/97; G06K 9/4638
See application file for complete search history.

(56) References Cited

U.S. PATENT DOCUMENTS

| | | |
|---|---|---|
| 5,432,712 A | 7/1995 | Chan |
| 9,674,505 B2 | 6/2017 | Wu et al. |
| 2008/0198924 A1 | 8/2008 | Ho et al. |
| 2011/0158528 A1 | 6/2011 | Yea et al. |
| 2014/0063188 A1 | 3/2014 | Smirnov et al. |
| 2015/0170370 A1 | 6/2015 | Ukil et al. |

OTHER PUBLICATIONS

International Search Report and Written Opinion for International Patent Application No. PCT/CN2015/094693 dated Jul. 27, 2016, 11 pages.
International Preliminary Report on Patentability for International Patent Application No. PCT/CN15/94693, dated May 31, 2018.

*Primary Examiner* — Maria E Vazquez Colon
(74) *Attorney, Agent, or Firm* — Green, Howard & Mughal LLP

(57) ABSTRACT

Techniques related to disparity search range compression are discussed. Such techniques may include determining a combination of disparity search values that do not coexist in any search range of multiple search ranges each associated with pixels of an initial disparity map, compressing the combination of disparity values to a single disparity label, and performing a disparity estimation based on a disparity search label set including the single disparity label.

25 Claims, 8 Drawing Sheets

DISPARITY SEARCH RANGE COMPRESSION

CLAIM OF PRIORITY

This application is a National Phase Application of, and claims priority to, PCT Application No. PCT/CN2015/094693 entitled "DISPARITY SEARCH RANGE COMPRESSION," filed Nov. 16, 2015, which is incorporated in its entirety for all purposes.

BACKGROUND

Determining pixel correspondence and disparity between images is a fundamental component of a variety of imaging technologies. For example, in camera array implementations, 3D information may be extracted from multiple 2D images of a scene obtained from different vantage points. Determining disparity between 2D images may include, for a given pixel in one image (e.g., a reference image) from a first vantage point, finding its location in another image (e.g., a target image) from a second vantage point. The shift in position of the pixel between the images is disparity. Such a disparity may be found for all pixels to generate a disparity map, which may be used to generate a depth map of the scene.

Current disparity search techniques used to determine the correct shift per pixel may search a range of possible shift values (e.g., d=[0, . . . , max D], where d is disparity and max D is a maximum disparity) to determine a best match. For example, a disparity search may compare a window around the given pixel in the reference image and search windows in the target image around each pixel in the target image in the range of possible shift values to find a best match search window and the associated best match pixel with the shift between them being the disparity value for the pixel.

It may be advantageous to provide low computational complexity, low memory usage, and high accuracy image disparity searching. It is with respect to these and other considerations that the present improvements are needed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
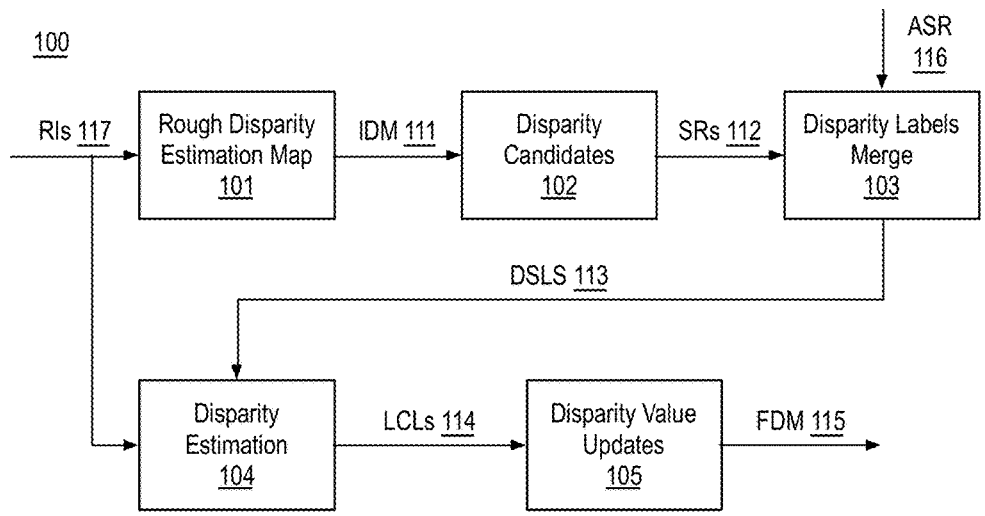
FIG. 1 illustrates an example device for generating a disparity map.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation.

Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein disparity search range compression.

As described above, determining pixel correspondence and disparity between images may be a fundamental component of a variety of image processing technologies. Such pixel correspondence and disparity may be performed, for example, between two or more images attained from different locations of a scene. Techniques discussed herein may provide for compressed search ranges that may enable faster searching with similar quality and better noise control as compared to full search range searching.

In some embodiments, an initial disparity map associated with two or more images may be received or generated. The initial disparity map may include estimated disparity values for individual pixels of the initial disparity map. Based on the initial disparity map, a search range may be generated for each of the individual pixels to provide multiple search ranges each including multiple disparity search values from an available search range. For example, each search range may include the estimated disparity value for the pixel and a range of pixels around the estimated disparity value. Based on the multiple search ranges, one or more combinations of disparity search values that do not coexist in any of the search ranges may be determined. Such combinations of disparity search values may be compressed to individual disparity labels. A disparity search label set including the individual disparity labels and disparity search values that could not be compressed may be generated and a disparity estimation of the images may be performed based on the disparity search label set. The disparity search label set may include fewer members than the available search range and may thereby save disparity searching during the disparity estimation.

For example, given an entire disparity search range of [0, . . . , max D], if a pair of disparity values do not coexist as possible disparity candidates for any single pixel, that pair of disparity values may be compressed to a single disparity label. Such processing may be repeated for all such pairs of disparity values to reduce the search range. The reduced search range may be used during the disparity estimation of the images to reduce the search requirements, which may provide faster searching or the like. Furthermore, the described techniques may not skip any potential disparity search values and may thereby offer the advantage of no quality loss.

As discussed, the entire disparity search range, starting search range, available search range, or the like may be from a value of 0 to a maximum disparity search value, max D (e.g., the search range may be [0, . . . , max D]). For example, max D may provide a maximum possible detected shift among pixels in the images and may therefore impact the runtime of the disparity searching. The maximum disparity search value, max D, may be determined using any suitable technique or techniques. In some examples, max D may be a preset or predetermined value. In other examples, max D may be determined based on image content (see, e.g., U.S. patent application Ser. No. 14/565,149 titled "Disparity Search Range Determination for Images from an Image Sensor Array, filed Dec. 9, 2014).

The techniques discussed herein may provide for efficient disparity searching based on disparity search range compression. Such techniques may provide for efficient searching without quality loss. For example, the techniques discussed herein may compress search ranges by about 44% and may reduce search runtime by about 1.7× (e.g., about 1.1× to 2.5×). Furthermore, such techniques may reduce noise control (e.g., bad pixels) as the compressed search ranges may limit noisy results.

FIG. 1 illustrates an example device 100 for generating a disparity map, arranged in accordance with at least some implementations of the present disclosure. As shown in FIG. 1, device 100 may include a rough disparity estimation map module 101, a disparity candidates module 102, a disparity labels merge module 103, a disparity estimation module 104, and a disparity value updates module 105. Device 100 may be any suitable form factor device. For example, device 100 may be a computer, a laptop computer, a tablet, a smart phone, a phablet, digital camera, a display device, a gaming device, a wearable device such as a smart watch, smart glasses, or the like. For example, device 100 may implement multiple cameras in a camera array to generate multiple images as discussed herein.

As shown, rough disparity estimation map module 101 may generate an initial disparity map (IDM) 111. Initial disparity map 111 may include any suitable disparity map having any suitable data structure. For example, initial disparity map 111 may be associated with two or more related images (RIs) 117 of a scene and initial disparity map 111 may include estimated disparity values for individual pixels thereof. Related images 117 associated with initial disparity map (and final disparity map 115 as is discussed further herein) may be any suitable images of a scene. In various examples, related images may be attained from a stereoscopic imaging device having two cameras or a camera array or the like. As is discussed further herein, final disparity map 115 may be generated based on related images 117 such that a disparity estimation is performed on related images 117 using a compressed disparity search range.

Figure 3:
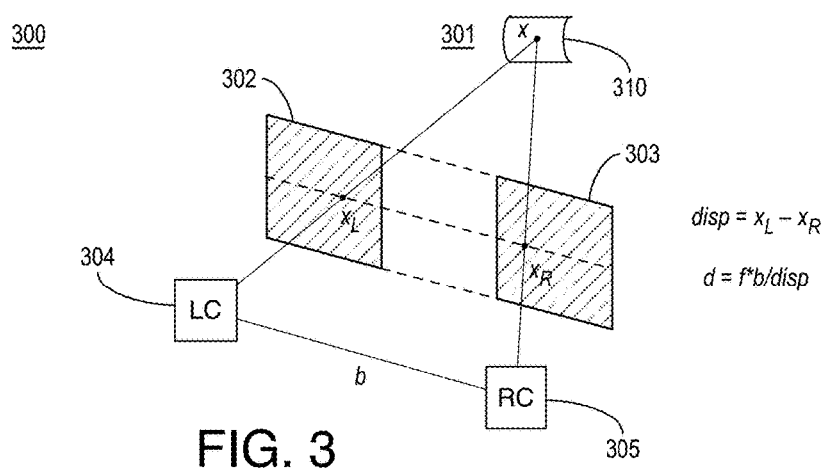
FIG. 3 illustrates an example stereoscopic image matching environment.

FIG. 3 illustrates an example stereoscopic image matching environment 300, arranged in accordance with at least some implementations of the present disclosure. As shown in FIG. 3, stereoscopic image matching environment 300 may include attaining a pair of images 302, 303 of a scene 301 including, for example, a surface 310. For example, images 302, 303 may be related images as discussed herein. In some examples, images 302, 302 may be rectified images. As shown, images 302, 303 may include a left or reference image 302 and a right or target image 303 attained via a left camera 304 and a right camera 305, respectively. As illustrated, in some examples, the left image may be the reference image and the right image may be the target image. In other examples, the right image may be the reference image and the left image may be the target image and/or additional target images may be used. Furthermore, scene 301 may include any suitable scene including indoor or outdoor scenes, scenes including objects and/or people, and so on. Images 302, 303 may include any suitable images, image data, or the like.

Furthermore, the disparity estimation techniques discussed herein may determine a disparity map or image that may be used to generate a depth image based on triangulating correspondences. For example, as shown in FIG. 3, given images 302, 303, each including a representation of three-dimensional point x on surface 310, the depth, d, of x, may be determined based on d=f*b/disp, where f and b are the focal length and base line, respectively, and disp, is the disparity for x, indicating the pixel displacement of x between rectified images 302, 303 (e.g., $x_L-x_R$, where $x_L$ and $x_R$ are the projections of x onto rectified images 302, 303, respectively). In the example of FIG. 3, disparity may be found between two images. Such techniques may be extended to multiple images attained via a camera array for example.

Returning to FIG. 1, as will be discussed further herein, disparity estimation as performed by disparity estimation module 104 between related images 117 may be based on a compressed disparity search range. Disparity estimation module 104 may determine disparities between related images 117 using the compressed disparity search range using any suitable technique or techniques. In some examples, disparity estimation module 104 may perform a best match window search to determine disparities between related images 117.

Figure 4:
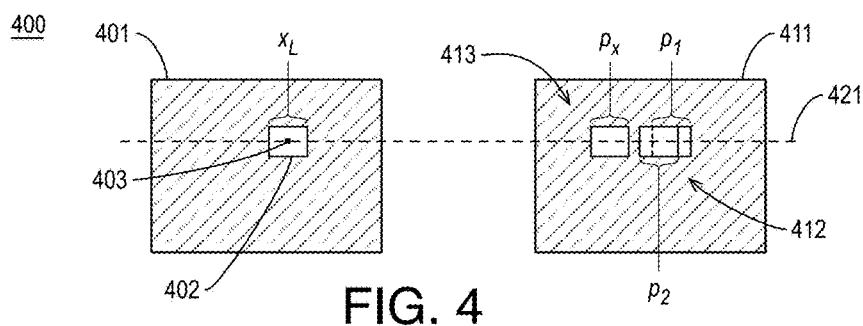
FIG. 4 illustrates an example best match window search for a pixel of a reference image within a target image.

FIG. 4 illustrates an example best match window search 400 for a pixel 403 of a reference image 401 within a target image 411, arranged in accordance with at least some implementations of the present disclosure. In the example of FIG. 4, reference image 401 is a left image, however, reference image 401 may be a right image in other examples. As shown in FIG. 4, a window 402 may be generated around the pixel position of pixel 403. Window 402 may have any shape and size. For example, pixel values within window 402 may be saved to memory and a best match window within target image 411 along base line 421 may be determined as a window having the closest match of pixel values to those within window 402. Such a match may be determined using any suitable technique or techniques such as generating a metric for each search window and maximizing or minimizing the metric or the like. For example, the best match search window may be a search window that minimizes a sum of absolute differences between window 402 and the search windows. In some examples, the metric may also be compared to a threshold to determine the best match is indeed a match.

As shown with respect to search windows 412, the search range for pixel 403 within target image 411 may range from through multiple positions such as positions $p_1, p_2, \ldots p_x$ such that the search positions are offset by one pixel or the like. The search range for pixel 403 and other pixels within reference image 401 to determine disparity values is discussed further herein. As discussed, the disparity value for pixel 403 may be associated with the position having a best match window such that the disparity value is the difference between the position of pixel 403 and the pixel position having the best match search window.

Figure 5:
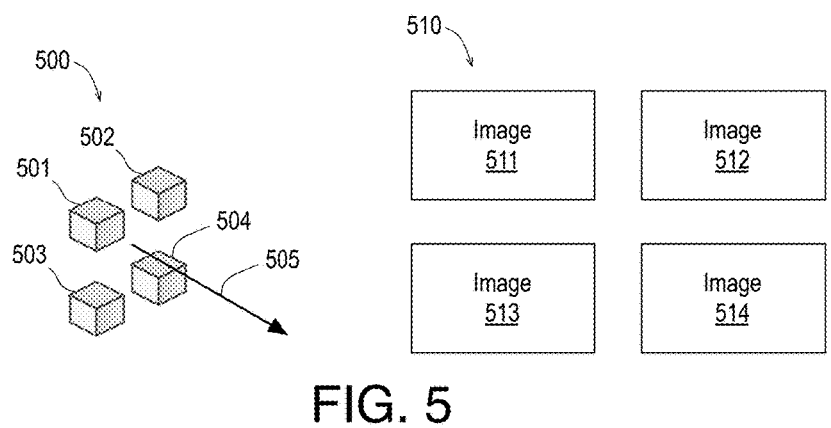
FIG. 5 illustrates an example camera array and example attained images for performing disparity estimation.

As discussed, the techniques for performing disparity estimation between related images such as related images 117 may be applied to two or more related images. FIG. 5 illustrates an example camera array 500 and example attained images 510 for performing disparity estimation, arranged in accordance with at least some implementations of the present disclosure. As shown in FIG. 5, camera array 500 may include multiple cameras 501-504 for attaining multiple images 511-514 in a direction 505 from cameras 501-504. As shown, an image may be attained from each camera of camera array 500. In the illustrated example, camera array 500 includes four cameras 501-504 that may attain four images 511-514; however, any suitable number of cameras and associated images may be used. In various examples, camera array includes 9 cameras (e.g., in a 3×3 grid), 16 cameras (e.g., in a 4×4 grid), or the like. Furthermore, in the illustrated example, camera array 500 includes cameras 501-504 evenly spaced and arranged in a grid pattern around a center; however, camera array 500 may include any suitable arrangement and spacing such as linear arrangements or the like. For example, as discussed herein, related images 117 may be any of images 302, 303, 511, 512, 513, 514, or any other suitable related images.

Returning to FIG. 1, initial disparity map 111 may be generated using any suitable technique or techniques. In an embodiment, initial disparity map 111 may be estimated based on a temporally prior disparity map that is associated with related images temporally prior to related images 117 associated with initial disparity map 111. Such temporally prior images and disparity map information may be attained in a video capture or video processing (e.g., with or without display to a user) mode. For example, the temporally prior disparity map may be a final disparity map generated for images attained prior to the images associated with initial disparity map 111. In some examples, the estimation based on the temporally prior disparity map may include or incorporate optical flow information. In another embodiment, initial disparity map 111 may be determined using a subset of cameras from a camera array such as a subset of cameras 501-504 of camera array 500.

In an embodiment, initial disparity map 111 may be generated via a depth sensor such as a radar depth sensor (e.g., including a radio wave transmitter and sensor). For example, automotive and/or robotic applications may use such radar depth sensing techniques to generate initial disparity map 111 (e.g., a coarse depth may be determined and converted to a disparity map). In some embodiments, the depth sensor may include an infrared (IR) sensor such as an IR camera or the like. For example, an IR transmitter may illuminate a scene with infrared light and one or more infrared cameras may attain stereo IR images, which may be used to generate initial disparity map 111. In such embodiments, a transformation operation such as, for example, a warping operation may be performed to transform the disparity map from a sensor based disparity or depth map to a reference camera based disparity or depth map. In other embodiments, initial disparity map 111 may be generated based on predetermined information (e.g., a priori knowledge) of a scene. For example, in the context of assembly line inspection, the distance to a target may be known. Furthermore, in the context of video conferencing, the distance to a user may be predetermined and/or roughly approximated based on a detected head size and/or arrangements of facial features or the like. Such distances may be used to generate initial disparity map 111 for example.

In another embodiment, initial disparity map 111 may be generated by estimating low resolution disparity values based on downsampled version of related images 117 and upsampling the low resolution disparity values to generate the estimated disparity values of initial disparity map 111. For example, rough disparity estimation map module 101 may downsample related images 117 and perform disparity estimation on the downsampled images. In some examples, related images 117 may be 2× downsampled to generate downsampled versions of related images 117. A disparity search operation may be performed on the downsampled versions with a search range of $[0, \ldots, \max D_L = \max D_H/2]$ where $\max D_H$ is the max disparity search limit for the high resolution images (e.g., related images 117) and $\max D_L$ is the max disparity search limit for the downsampled versions. Such disparity searching may provide a low resolution disparity map, $disp_L$. The low resolution disparity map, $disp_L$, may then be up-scaled by 2× to a high resolution initial disparity map, $disp_H$. Such up-scaling may be performed using any suitable technique or techniques such as nearest neighbor up-sampling or the like. In such examples, the high resolution initial disparity map, $disp_H$, may be provided as initial disparity map 111. Initial disparity map 111 may be characterized as a rough disparity estimation map or the like.

As shown, initial disparity map 111 may be received by disparity candidates module 102. As discussed, initial disparity map 111 may include estimated disparity values for individual pixels thereof. Disparity candidates module 102, based on initial disparity map 111, may generate a search range for each, most, or at least some of the individual pixels of initial disparity map 111. Disparity candidates module 102 may thereby generate multiple search ranges (SRs) 112 such that the search ranges are each associated with an individual pixel and such that the search ranges each include multiple search values from an available search range.

Figure 2:
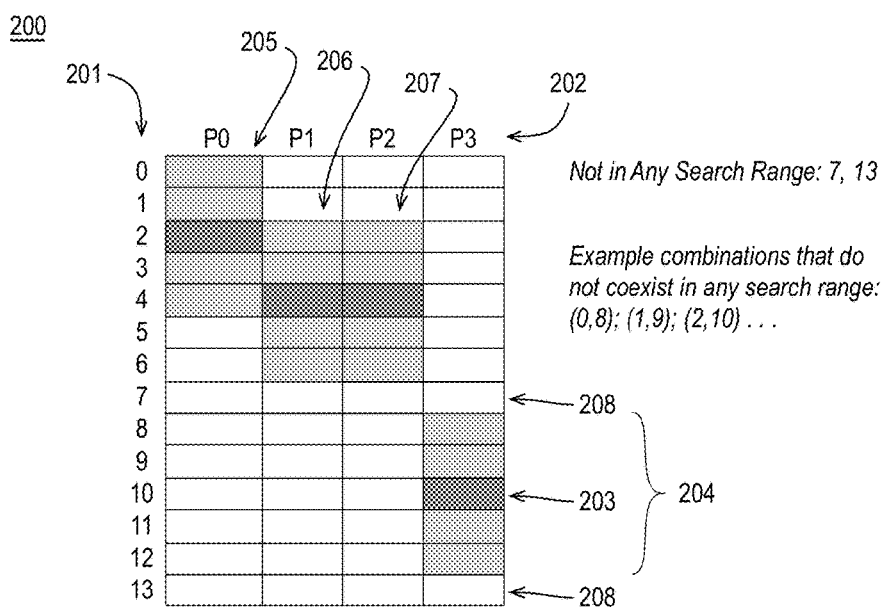
FIG. 2 illustrates an example data structure of example search ranges within example available search range for example pixels.

FIG. 2 illustrates an example data structure 200 of example search ranges 204-207 within example available search range 201 for example pixels 202, arranged in accordance with at least some implementations of the present disclosure. As shown in FIG. 2, disparity candidates module 102 may generate search ranges 204-207 associated with example pixels 202. In the illustrated example, search range 204 is associated with pixel P3, search range 205 is associated with pixel P0, search range 206 is associated with pixel P1, and search range 207 is associated with pixel P2. As shown, each of search ranges 204-207 includes multiple disparity values from available search range 201. In the illustrated example, available search range 201 includes disparity values 0-13; however, available search range 201 may include any suitable disparity values such as a range of disparity values of [0, . . . , max $D_H$] (e.g., available search range 201 may include a range of search values from zero up to max $D_H$), where max $D_H$ may be a maximum disparity value. The maximum disparity value, max $D_H$, may be any suitable value such as a predefined maximum disparity value, a maximum disparity value determined based on the image content of related images 117, or the like.

As illustrated with respect to search range 204 of pixel P3, search ranges 204-207 may be generated based on an estimated disparity value 203 associated with the pixel such as pixel P3 such that search range 204 extends from estimated disparity value 203 minus an error tolerance range to estimated disparity value 203 plus an error tolerance range. In the illustrated example, the error tolerance range is 2 and estimated disparity value 203 is 10 such that search range 204 extends from a disparity value of 8 to a disparity value of 12 and includes 5 members. Similarly, using an error tolerance range of 2, search range 205 may extend from disparity values 0 to 4 based on pixel P0's estimated disparity value being 2 and search ranges 206, 207 may each extend from disparity values 2 to 6 based on pixel P1 and P2 both having estimated disparity values of 2. Although discussed with respect to an error tolerance range of 2, the error tolerance range may be any suitable value such as 1, 3, 4, 5, or more. In some examples, the error tolerance range may be associated with a downscaling factor used to generate initial disparity map 111. For example, the error tolerance range may be equal to the downscaling factor applied to generate downsampled version of related images 117 (e.g., if downsampling is 2×, the error tolerance range=2, if downsampling is 3×, the error tolerance range=3, and so on) as discussed herein. In some examples, the error tolerance range may be experimentally determined.

Furthermore, the illustrated example provides an equal tolerance range on each side of the estimated disparity value. In other examples, they may be different such that one side (e.g., the negative side) may have a value of 2 and the other side (e.g., the positive side) may have a value of 3 or the like. Also, in some embodiments, one or more of search ranges 204-207 may have disparity values from available search range 201 added thereto. For example, a disparity value from a neighboring pixel may be added to the search range based on a detected edge or the like. For example, if there is a detected edge to the left of a pixel, disparity values from neighboring pixels to the right of the pixel may be added to the search range.

As discussed, for example, for each pixel $p_i$ in initial disparity map 111 (e.g., the high resolution disparity map, $disp_H$), if the initial estimated disparity is $disp_H(p_i)=d_i$, the search range (e.g., possible disparity search range) in the high resolution image may be set as $D_i=[d_i-t, \ldots , d_i, \ldots , d_i+t]$, where t is the error tolerance range. As discussed such search ranges may be generated for each pixel. For example, given N pixels in an image, N such search ranges $[D_0 \ldots D_N]$ may be obtained. Such search ranges may be included in search ranges 112.

As shown, search ranges 112 and an available search range 116 such as available search range 201 or the like may be received by disparity labels merge module 103 and by disparity labels merge module 103 may generate a disparity search label set (DSLS) 113. Disparity labels merge module 103 may generate disparity search label set 113 using any suitable technique or techniques. For example, disparity labels merge module 103 may determine at least one combination of disparity search values that do not coexist in any of search ranges 112. Furthermore, disparity labels merge module 103 may determine any disparity search values that do not exist in any of search ranges 112. Disparity labels that do not exist in any of search ranges 112 may be discarded (e.g., eliminated available search range 116 when generating disparity search label set 113).

Combinations of disparity search values that do not coexist in any of search ranges 112 may be compressed to single disparity labels and added to disparity search label set 113. For example, each combination may be compressed to a single disparity label that represent the compressed combination of search values. Thereby, disparity search label set 113 may include uncompressible search values (e.g., search values that do coexist in at least one search range of search ranges 112) and disparity labels of compressed search values (e.g., combinations of disparity search values that do not coexist in any of search ranges 112 that have been compressed), and disparity search label set 113 may exclude any disparity search values that do not exist in any of search ranges 112.

For example, with reference to FIG. 2, disparity labels merge module 103 may determine disparity search values 208 such as 7 and 13 that are not in any of search ranges 204-207 and disparity labels merge module 103 may exclude search values 7 and 13 from disparity search label set 113. Furthermore, disparity labels merge module 103 may determine combinations of disparity search values such as combinations (0,8), (1,9), (2,10), and so on that do not coexist in any of search ranges 204-207. Disparity labels merge module 103 may determine combinations of disparity search values that do not coexist in any of such search ranges using any suitable technique or techniques such as graph coloring techniques as discussed herein.

For example, as discussed, if disparity values $d_x$ and $d_y$ never coexist (e.g., do not coexist) in any search range $D_i$, $d_x$ and $d_y$ may not be considered as possible disparity candidates for the same pixel such that, for any pixel, a search may be performed for either $d_x$ or search $d_y$. Therefore, disparity labels (e.g., values) $d_x$ and $d_y$ may be combined to a single, unique disparity label. Such processing may be repeated for some or all such pairs of disparity values that never coexist in any search range such that they may be compressed to individual disparity labels. Such compression may provide for a reduced disparity search range or space of $(d'_0, d'_1, \ldots, d'_m)$, as compared to available search range 116, which may have a full range of $(0, \ldots, \max D_H)$.

With further reference to FIG. 2, assuming an image with four pixels, P0-P3 and available search range 201 of $(0 \ldots \max D=13)$, exemplary initial estimated disparity values of $d_0=2, d_1=4, d_2=4, d_3=10$ may be determined. As discussed, search ranges 204-207 may be set for each pixel of pixels P0-P3 as $d-2 \ldots d+2$ (e.g., such that the error tolerance range is 2) such that, for example, for P0, $D_0=(0,1,2,3,4)$, for P1 and P2, $D_1=D_2=(2,3,4,5,6)$, and for P3, $D_3=(8,9,10,11,12)$. Based on such an example, for P0, any disparity label pair in the set $(0,1,2,3,4)$ is not compressible, for P1 and P2, any disparity pair in the set $(2,3,4,5,6)$ is not compressible, and for P3, any pair in the set $(8,9,10,11,12)$ is not compressible since all of the pairs in those sets coexist in a search range. However, disparity labels (e.g., disparity values in this context) 0 and 8 may be compressed to a disparity label a0 since 0 and 8 do not coexist in any search range. Similarly, disparity labels (1,9) may be compressed to disparity label a1, disparity labels (2,10) may be compressed to a2, disparity labels (3,11) may be compressed to a3, and disparity labels (4,12) may be compressed to a4. As discussed, disparity labels or values 7 and 13 do not exist in any search range and they may eliminated from the disparity search completely. Based on such search range compression, available search range 201 (e.g., including 14 members) may be compressed to a disparity search range or disparity search label set of (a0, a1, a2, a3, a4, 5 and 6) (e.g., including 7 members). As discussed, the disparity search label set may be compressed to include fewer members than the available search range. In the example of FIG. 2, instead of searching 14 labels, only 7 labels may need to be searched. In such an example, computational cost is thereby reduced by half. Such a disparity search label set may be provided as disparity search label set 113.

Returning to FIG. 1, as discussed, combinations of disparity search values that do not coexist in any of search ranges 112 may be determined by disparity labels merge module 103. Such combinations may be determined using any suitable technique or techniques. As will be appreciated, such techniques may find some or all of such combinations. In some examples, techniques that provide only some such combinations or suboptimal combinations may be implemented. In some examples, such combinations may be determined using a graph coloring technique or techniques.

Figure 6:
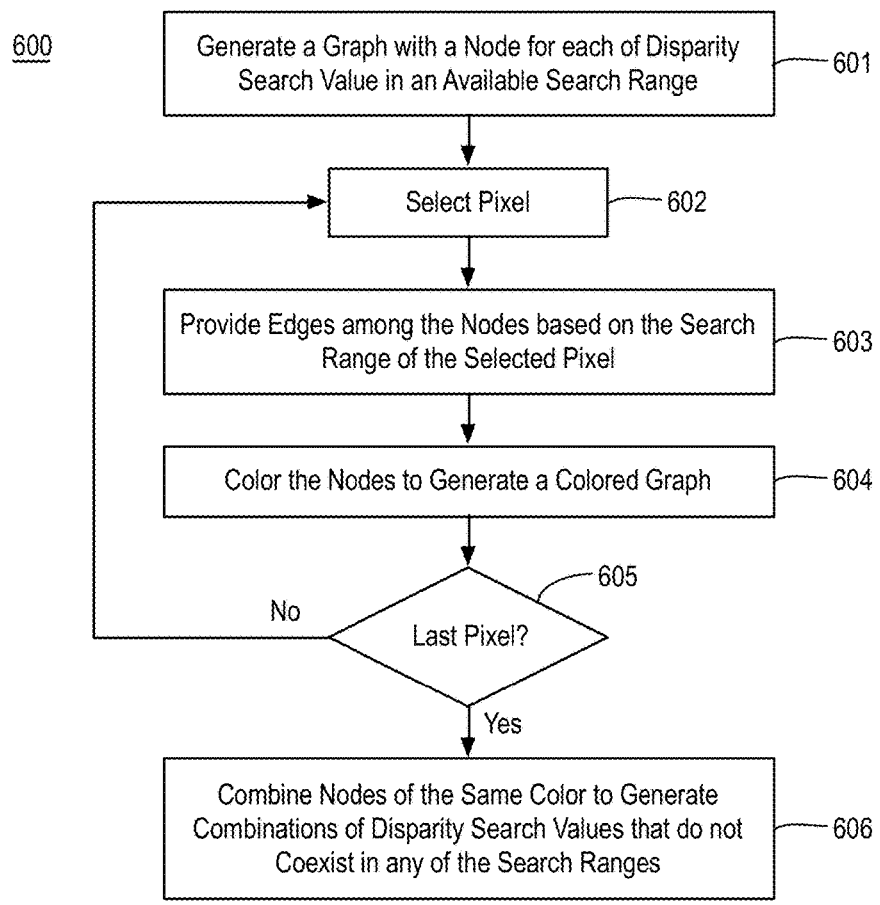
FIG. 6 illustrates an example process for generating combinations of disparity search values that do not coexist in any of multiple search ranges.

FIG. 6 illustrates an example process 600 for generating combinations of disparity search values that do not coexist in any of multiple search ranges, arranged in accordance with at least some implementations of the present disclosure. Process 600 may include one or more operations 601-606 as illustrated in FIG. 6. Process 600 or portions thereof may be performed by a device (e.g., device 100 or any other device or system discussed herein) to generate combinations of disparity search values that do not coexist in any of multiple search ranges. Process 600 or portions thereof may be repeated for any number of instances of disparity value search ranges.

As shown, process 600 may begin at operation 601, where a graph with a node for each of the disparity search values from an available search range may be generated to provide a graph with a plurality of nodes. For example, a graph may be generated with a node for each disparity search value in available search range 116 or 201 or the like. The graph may be generated using any suitable technique or techniques and may include any suitable data structure representing the graph.

Processing may continue at operation 602, where a pixel may be selected. For example, the pixel may be associated with a search range as generated with respect to search ranges 102. Furthermore, processing via process 600 may operate on a pixel-by-pixel basis via operation 602 and decision operation 605. Processing may continue at operation 603, where edges may be provided among the nodes generated at operation 601 such that the edges are associated with the search range of the individual pixel selected at operation 602. The edges may be provided using any suitable technique or techniques and may include any suitable data structure to provide or represent edges within the graph generated at operation 601.

Processing may continue at operation 604, where the nodes generated at operation 601 may be colored based on the edges provided at operation 603 to generate a colored graph associated with the pixel selected at operation 602. The colored graph may be generated using any suitable technique or techniques and may include any suitable data structure to provide or represent a colored graph. Processing may continue at decision operation 605, where a determination may be made as to whether the pixel selected at operation 602 is a last pixel. If not, processing may continue at operations 602-604 as discussed such that edges may be provided for each of the individual pixels having an associated search range and a colored graph may be generated for each of the individual pixels.

If the pixel selected at operation 602 is a last pixel to be processed, processing may continue at operation 606, where nodes of the same color may be combined to generate one or more combinations of disparity search values that do not coexist in any of the search ranges. For example, the multiple colored graphs each associated with an individual pixel may be processed to combine nodes of the same color to generate one or more combinations of disparity search values that do not coexist in any of the search ranges.

As discussed, for example, a graph coloring technique may be used to determine combinations of disparity search values that do not coexist in any of the search ranges. Such techniques may include generating a graph, G, with nodes $0 \ldots \max D$. For each pixel, edges may be created among the disparity nodes such that, for example with reference to FIG. 2, for P0, $D_0=(0,1,2,3,4)$, edges may be created among nodes 0, 1, 2, 3, 4 of graph G. As discussed, such edges may be created for all of the pixels and the nodes may be colored and nodes having the same color may be combined to identify combinations of disparity search values that do not coexist in any of the search ranges.

Returning to FIG. 1, disparity estimation module 104 may receive disparity search label set 113 and disparity estimation module 104 may perform a disparity estimation search between related images 117 based on disparity search label set 113 to generate lowest cost labels (LCLs) 114. As discussed, disparity search label set 113 may be compressed to include fewer members than available search range 116. Disparity estimation module 104 may perform disparity estimation using any suitable technique or techniques to generate lowest cost labels 114. For example, disparity estimation module 104 may determine a cost at each pixel for each label in disparity search label set 113 and set the disparity for each pixel as the lowest cost label. In an embodiment, disparity estimation module 104 may implement a window based search as discussed with respect to FIG. 4, a global search technique, a variable support structure technique, or the like. In any event, disparity estimation module 104 may perform disparity estimation based on compressed disparity search label set 113.

As discussed, disparity search label set 113 may include one or more disparity labels that include compressed disparity values (e.g., two disparity values compressed and represented as a single disparity values). In implementing disparity estimation, performing disparity estimation for a compressed disparity label, a determination may be made as to whether a first or second value of the compressed disparity label is within a search range for a particular pixel. For example, with reference to FIG. 2, if disparity values 0 and 8 have been compressed to a disparity label of a0, when evaluating disparity label a0 for pixel P0, a determination may be made that disparity value 0 is within search range 205 and disparity value 0 may be evaluated (e.g., a cost related with disparity value 0) for disparity label a0. Similarly, when evaluating disparity label a0 for pixel P3, a determination may be made that disparity value 8 is within disparity range 202 and disparity value 8 may be evaluated (e.g., a cost related with disparity value 8) for disparity label a0. Using such techniques, a relevant cost for various pixel and disparity label combinations may be determined. If a determination is made that neither disparity value of a disparity label is within a pixel's search range, the label may be discarded or the disparity value of the disparity label closest to the pixel's search range may be evaluated, or the like.

For example, as discussed, disparity labels or values $d_x$ and $d_y$ may be combined to one unique disparity label d' (e.g., via disparity labels merge module 103). Since $d_x$ and $d_y$ do not coexist in any $D_i$, for a pixel $p_i$, during disparity estimation (e.g., via disparity estimation module 104), the disparity cost for disparity label d' may be represented using a cost either from a cost associated with $d_x$ if $d_x$ is a member of $D_i$ or a cost associated with $d_y$ if $d_y$ is a member of $D_i$, as shown in Equation (1):

$$C(p_i, d') = \begin{cases} C(p_i, d_x \in D_i) \\ C(p_i, d_y \in D_i) \end{cases} \quad (1)$$

where C may be the cost at pixel $p_i$ for disparity label d'. As provided in Equation (1) and elsewhere herein, performing disparity estimation for related images such as related images 117 may include, for a particular pixel, determining whether a first (e.g., $d_x$) or a second (e.g., $d_y$) of a combination of disparity search values represented by a single disparity label (e.g., d') is within a search range (e.g., $D_i$) associated with the pixel and determining a cost (e.g., C) of the single disparity label for the pixel based on the first or second of the combination of disparity search values being within the first search range.

As shown, lowest cost labels 114 may be provide by disparity estimation module 104 such that, for each pixel location, lowest cost labels 114 includes a label of disparity search label set 113 having a lowest cost for the particular pixel location or value. With continued reference to the example discussed with respect to FIG. 2, lowest cost labels 114 may include, for each pixel location, a lowest cost label selected from one of (a0, a1, a2, a3, a4, 5 and 6). For example, as discussed, after the compressed disparity labels are generated (e.g., via disparity labels merge module 103),
an updated cost function may be generated (e.g., defined and loaded) by and disparity estimation module 104. Such a cost function may be applied by disparity estimation module 104 in the context of any suitable disparity estimation technique to determine an optimized cost label for each pixel within the disparity search label set 113 (e.g., d'$_0$, d'$_1$, . . . , d'$_m$). The resulting disparity map may be labeled Disp' and may be provided as lowest cost labels 114.

Disparity values updates module 105 may receive lowest cost labels 114 and disparity values updates module 105 may generate final disparity map 115 based on lowest cost labels 114. For example, final disparity map 115 may include a disparity value for all pixel locations of related images 117. For pixel locations having a lowest cost label that is a disparity value associated therewith, final disparity map 115 may include the disparity value for such pixel locations.

For pixel locations having a compressed disparity label representative of multiple disparity values, disparity values updates module 105 may determine a disparity value from the compressed disparity label. For example, with reference to FIG. 2, if pixel P3 has a lowest cost label associated with a0, disparity values updates module 105 may determine from disparity values 0 and 8 (e.g., disparity values represented by compressed disparity label a0), which value is within the range of search range 204 to determine the disparity value for pixel P3, which in the context of this example, is 8. If a compressed disparity label is associated with a pixel such that the pixel's range does not include either of the disparity values represented by the compressed disparity label, the technique used to determine which value was evaluated may be reversed to determine the value represented by the compressed disparity label. For example, if the closest disparity value to the pixel's search range was used for the compressed disparity label, the closest disparity value to the pixel's search range may be provided by disparity values updates module 105 in final disparity map.

For example, as discussed, for compressed disparity labels in Disp' (e.g., as provided via lowest cost labels 114), each such compressed disparity label in Disp' may be decoded to generate an actual disparity map Disp, which may be provided as final disparity map 115. For example, compressed disparity labels in Disp' may be decoded to determine actual disparity values (e.g., pixel shift values) as provided in Equation (2):

$$Disp(p_i) = \begin{cases} d_x, Disp'(p_i) = d' \text{ and } d_x \in D_i \\ d_y, Disp'(p_i) = d' \text{ and } d_y \in D_i \end{cases} \quad (2)$$

where Equation (2) may be read as: the final disparity map (Disp) value at pixel ($p_i$) is a first disparity value ($d_x$) if the lowest cost label (Disp') for the pixel is a compressed disparity label (d') and the first disparity value is in the pixel's search range ($D_i$) and the final disparity map (Disp) value at pixel ($p_i$) is a second disparity value ($d_y$) if the lowest cost label (Disp') for the pixel is a compressed disparity label (d') and the second disparity value is in the pixel's search range ($D_i$) such that compressed disparity label (d') includes or represents the first and second disparity values. As provided in Equation (2) and elsewhere herein, generating a final disparity map may include, for a pixel, determining a disparity label is the lowest cost label for the pixel and determining a first disparity value for the first pixel from a first or a second of the combination of disparity search values represented by the single disparity label based on the first or the second of the combination of disparity search values being within a first search range associated with the pixel.

Figure 7:
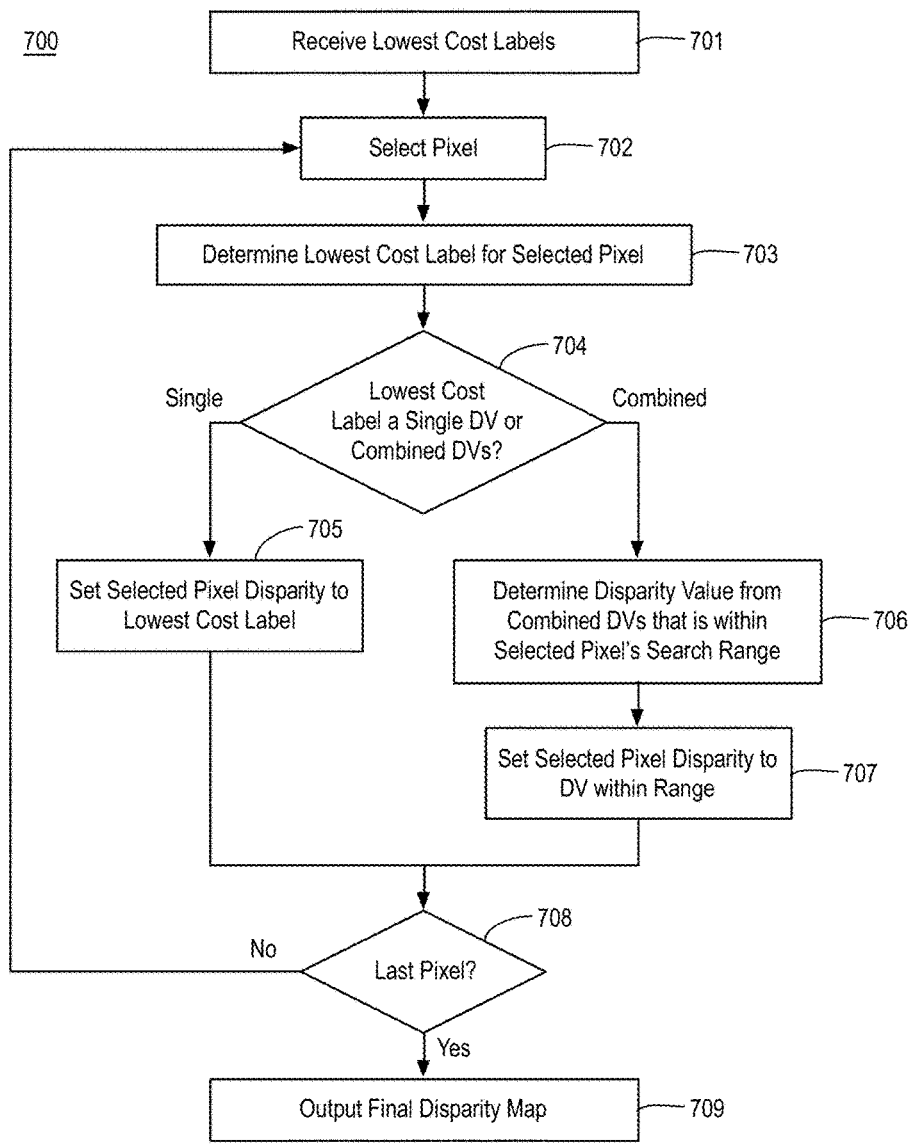
FIG. 7 illustrates an example process for generating a final disparity map based on lowest cost labels.

FIG. 7 illustrates an example process 700 for generating a final disparity map based on lowest cost labels, arranged in accordance with at least some implementations of the present disclosure. Process 700 may include one or more operations 701-709 as illustrated in FIG. 7. Process 700 or portions thereof may be performed by a device (e.g., device 100 or any other device or system discussed herein) to generate a final disparity map. Process 700 or portions thereof may be repeated for any number of instances of lowest cost labels to generate associated final disparity maps.

As shown, process 700 may begin at operation 701, where lowest cost labels may be received. For example, lowest cost labels 114 (e.g., a disparity map including compressed disparity labels) may be received via disparity values updates module 105 or the like. Processing may continue at operation 702, where a pixel may be selected. For example, the pixel may be associated with a lowest cost label of lowest cost labels 114. Furthermore, processing via process 600 may operate on a pixel-by-pixel basis via operation 702 and decision operation 705. Processing may continue at operation 703, where a lowest cost label may be determined for the pixel selected at operation 702. The lowest cost label may be determined using any suitable technique or techniques and may include any suitable data structure.

Processing may continue at decision operation 704, where a determination may be made as to whether the lowest cost label determined at operation 703 is a single disparity value or compressed combination of two or more disparity values. If the lowest cost label determined at operation 703 is a single disparity value, processing may continue at operation 705, where the disparity value for the pixel selected at operation 702 may be set to the lowest cost label (e.g., a disparity value) determined at operation 703.

If the lowest cost label determined at operation 703 is a compressed combination of two or more disparity values, processing may continue at operation 706, where a disparity of the disparity values represented by the compressed disparity label may be determined that is within the search range of the pixel selected at operation 702 and at operation 707, where the disparity value for the pixel selected at operation 702 may be set to the disparity value from the combined disparity values that is within the pixel's disparity range.

Processing may continue from operation 705 or operation 707 at decision operation 708, where a determination may be made as to whether the pixel selected at operation 702 is a last pixel. If not, processing may continue at operations 702-707 as discussed such that disparity values may be provided for each of the individual pixels.

If the pixel selected at operation 702 is a last pixel to be processed, processing may continue at operation 709, where a final disparity map including the disparity values for the pixels may be output.

Returning to FIG. 1, final disparity map 115 may be used in a variety of contexts and applications such as 3D computer vision applications including 3D depth reconstruction, 3D object segmentation, 3D object detection/recognition/tracking, or the like. As discussed herein, a final disparity map may be generated based on two or more related images. In some applications, the final disparity map may be converted to a depth map based on parameters (e.g., camera locations and the like) used to attain the related images.

Furthermore, the techniques discussed herein have been discussed with respect to combining two disparity values that do not coexist in any search ranges to a single disparity label. However, such techniques may combine any number of disparity values that do not coexist in any search ranges to a single disparity label such as 3 or 4 disparity values or the like.

Figure 8:
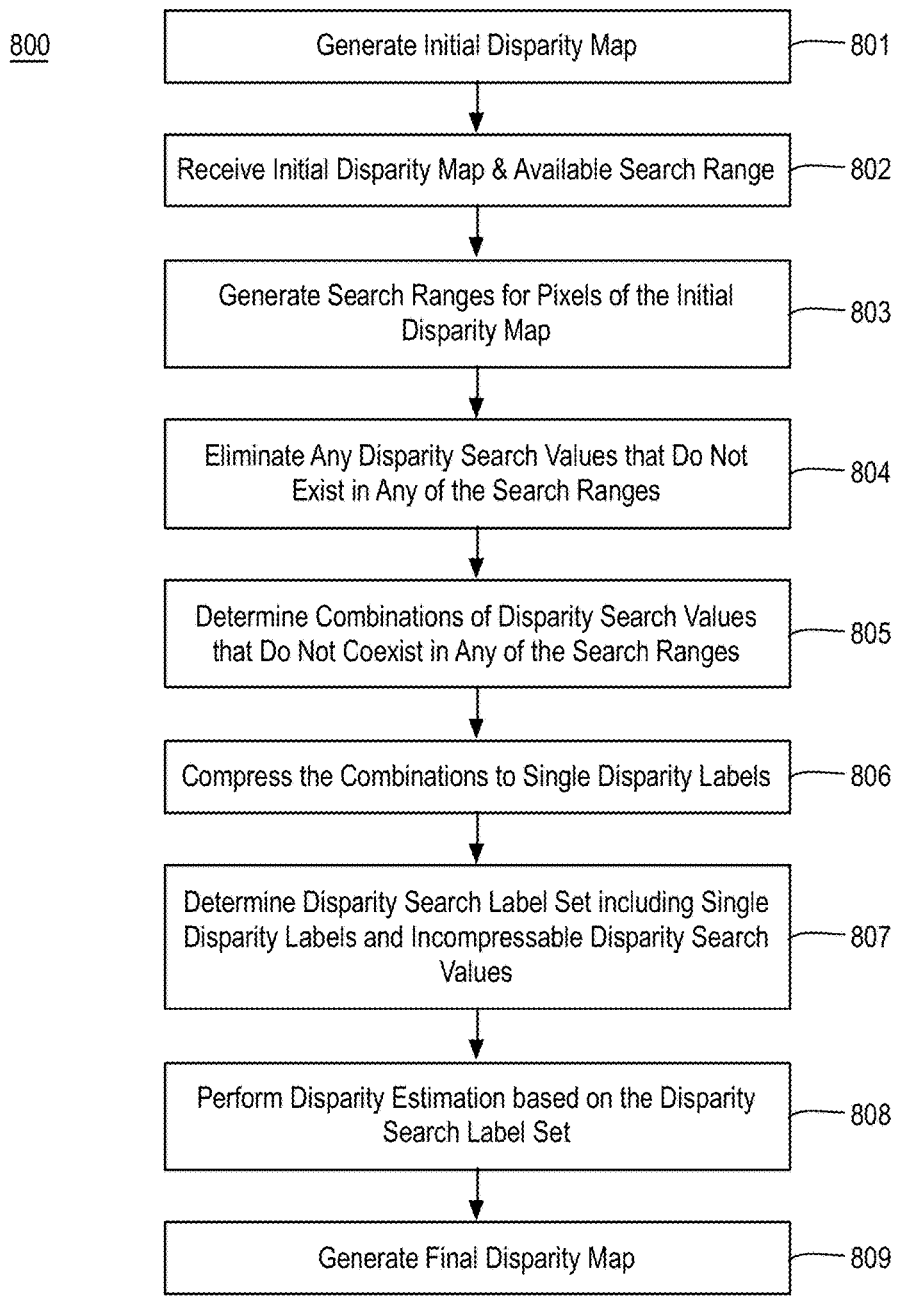
FIG. 8 is a flow diagram illustrating an example process for generating a disparity map.

FIG. 8 is a flow diagram illustrating an example process 800 for generating a disparity map, arranged in accordance with at least some implementations of the present disclosure. Process 800 may include one or more operations 801-809 as illustrated in FIG. 8. Process 800 may form at least part of an image processing technique. By way of non-limiting example, process 800 may form at least part of an image processing technique performed by device 100. Furthermore, process 800 will be described herein with reference to system 900 of FIG. 9.

Figure 9:
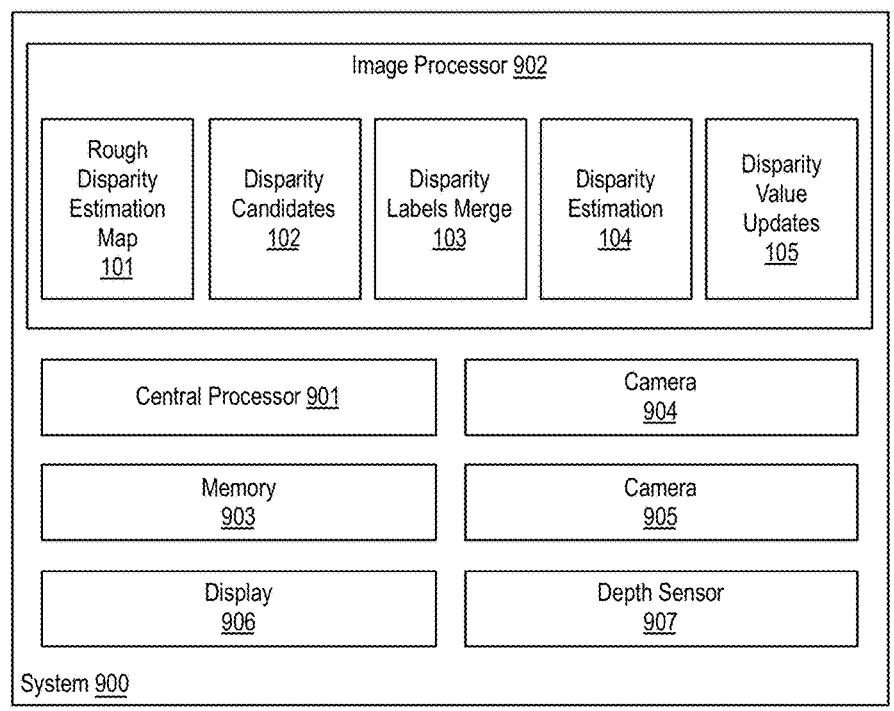
FIG. 9 is a flow diagram illustrating an example system for generating a disparity map.

FIG. 9 is an illustrative diagram of an example system 900 for generating a disparity map, arranged in accordance with at least some implementations of the present disclosure. As shown in FIG. 9, system 900 may include a central processor 901, an image processor 902, a memory 903, cameras 904, 904, and a display 906. Also as shown, image processor 902 may include or implement rough disparity estimation map module 101, disparity candidates module 102, disparity labels merge module 103, disparity estimation module 104, and disparity value updates module 105. Such components or modules may be implemented to perform operations as discussed herein. In the example of system 900, memory 903 may include or implement related images, initial disparity maps, search ranges, available search ranges, disparity search label sets, lowest cost labels, final disparity maps, or any other data discussed herein.

As shown, in some examples, rough disparity estimation map module 101, disparity candidates module 102, disparity labels merge module 103, disparity estimation module 104, and disparity value updates module 105 may be implemented via image processor 1302. In other examples, one or more or portions of rough disparity estimation map module 101, disparity candidates module 102, disparity labels merge module 103, disparity estimation module 104, and disparity value updates module 105 may be implemented via central processor 1301 or a graphics processor. In yet other examples, one or more or portions of rough disparity estimation map module 101, disparity candidates module 102, disparity labels merge module 103, disparity estimation module 104, and disparity value updates module 105 may be implemented via an imaging processing pipeline or unit.

Image processor 1302 may include any number and type of graphics or image processing units that may provide the operations as discussed herein. In some examples, image processor 1302 may be an image signal processor. Such operations may be implemented via software or hardware or a combination thereof. For example, image processor 1302 may include circuitry dedicated to manipulate image data obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of rough disparity estimation map module 101, disparity candidates module 102, disparity labels merge module 103, disparity estimation module 104, and disparity value updates module 105 may be implemented via an execution unit (EU). The EU may include, for example, programmable logic or circuitry such as a logic core or cores that may provide a wide array of programmable logic functions. In an embodiment, one or more or portions of rough disparity estimation map module 101, disparity candidates module 102, disparity labels merge module 103, disparity estimation module 104, and disparity value updates module 105 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of rough disparity estimation map module 101, disparity candidates module 102, disparity labels merge module 103, disparity estimation module 104, and disparity value updates module 105 may be implemented via an application specific integrated circuit (ASIC). The ASIC may include an integrated circuitry customized to perform the operations discussed herein.

Cameras 904, 905 may be any suitable cameras including image sensors to attain images such as any image discussed herein. In some examples, cameras 904, 905 may be situated to attain related images 117, images 302, 303, or the like. As shown, in some examples, system 900 may include two cameras 904, 905. In other examples, system 900 may include a camera arranged as discussed with respect to FIG. 5 for example. Display 906 may be any suitable display for presenting images or video to a user.

Returning to FIG. 8, process 800 may begin at operation 801, where an initial disparity map may be generated. For example, the initial disparity map may be generated by rough disparity estimation map module 101 as implemented via image processor 902. In an embodiment, generating the initial disparity map includes estimating the initial disparity map based on a temporally prior disparity map associated with two or more images temporally prior to two or more images associated with the initial disparity map. In another embodiment, generating the initial disparity map includes estimating low resolution disparity values based on downsampled versions of images associated with the initial disparity map and upsampling the low resolution disparity values to generate the estimated disparity values. In another embodiment, generating the initial disparity map includes generating the initial disparity map via a depth sensor such as generating the initial disparity map using a radar or IR depth sensor or depth camera or the like. In another embodiment, generating the initial disparity is based on predetermined information of a scene associated with the two or more images such as a distance to a target or a distance to a user or the like.

Processing may continue at operation 802, where an initial disparity map associated with two or more images and an available search range may be received such that the initial disparity map includes estimated disparity values for individual pixels of the initial disparity map. For example, the initial disparity map and the available search range may be received by disparity candidates module 102 and disparity labels merge module 103, respectively such that one or both may be as implemented via image processor 902. For example, the initial disparity map may be generated at operation 801 or received from another device or the like.

Processing may continue at operation 803, where, based on the initial disparity map, a search range may be generated for each of at least some of the individual pixels to provide a plurality of search ranges each including multiple disparity search values from an available search range. For example, the search ranges may be generated by disparity candidates module 102 as implemented via image processor 902. In an embodiment, generating the search ranges includes, for a particular pixel of the individual pixels having a particular estimated disparity value, generating a search range for the particular pixel from the particular estimated disparity value minus an error tolerance range to the particular estimated disparity value plus the error tolerance range. In another embodiment, generating the search ranges includes, for a particular pixel of the individual pixels, adding at least one disparity value from a pixel neighboring the particular pixel. The available search range may include any suitable search range such as a search range ranging from zero up to a maximum disparity value such that the maximum disparity value is a predefined maximum disparity value or determined based on image content of at least one of the images.

Processing may continue at operation 804, where any disparity search values from the available search range that do not exist in any of the search ranges may be eliminated from inclusion in a disparity search label set. For example, such disparity search values may be eliminated from inclusion in a disparity search label set by disparity labels merge module 103 as implemented via image processor 902.

Processing may continue at operation 805, where at least one combination of disparity search values that do not coexist in any of the search ranges generated at operation 803 may be determined. For example, such combinations of disparity search values that do not coexist in any of the search ranges may be determined by disparity labels merge module 103 as implemented via image processor 902. Such combinations may be determined using any suitable technique or techniques. In an embodiment, determining the combination of disparity search values includes generating a graph with a node for each of the disparity search values from the available search range to provide the graph with a plurality of nodes, providing, for each of the individual pixels, edges among the nodes associated with the search range of the individual pixel, coloring, for each of the individual pixels, the plurality of nodes to generate a plurality of colored graphs, and combining nodes of the same color to generate one or more combinations of disparity search values that do not coexist in any of the search ranges.

Processing may continue at operation 806, where the combination of disparity values determined at operation 805 may be compressed to a single disparity label. For example, the combination of disparity values determined may be compressed to a single disparity label by disparity labels merge module 103 as implemented via image processor 902.

Processing may continue at operation 807, where a disparity search label set including the compressed single disparity label generated at operation 806, any other compressed single disparity label, and incompressible disparity search values (e.g., search values that coexist in at least one search range) may be determined. For example, the disparity search label set may be determined by disparity labels merge module 103 as implemented via image processor 902.

Processing may continue at operation 808, where disparity estimation of the related images may be performed based on a disparity search label set that includes the single disparity label and has fewer members than the available search range. For example, the disparity estimation may be performed by disparity estimation module 104 as implemented via image processor 902. The disparity estimation may be performed using any suitable technique or techniques. In an embodiment, the disparity estimation provides a lowest cost label from the disparity search label set for each of the individual pixels. In another embodiment, performing the disparity estimation includes, for a particular pixel, determining whether a first or a second of the combination of disparity search values represented by the single disparity label generated at operation 806 is within a first search range associated with the first pixel and determining a cost of the single disparity label for the particular pixel based on the first or second of the combination of disparity search values being within the first search range.

Processing may continue at operation 809, where a final disparity map may be generated. For example, the final disparity map may be generated by disparity values updates module 105 as implemented via image processor 902. The final disparity map may be generated using any suitable technique or techniques. In an embodiment, generating the final disparity map includes, for a particular pixel, determining a single disparity label is the lowest cost label for the particular pixel and determining a disparity value for the particular pixel from a first or a second of the combination of disparity search values represented by the single disparity label based on the first or the second of the combination of disparity search values being within a search range associated with the particular pixel.

Process 800 may be repeated any number of times either in series or in parallel for any number of disparity maps and related images. Process 800 may provide for reduced disparity search ranges to speed up disparity searching. Such techniques provide for high quality searching with lower computational requirements. For example, process 800 may provide for high quality disparity map data for use by subsequent modules or stages of an image processing pipeline.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as scanners (e.g., to perform optical scanning to generate scanned input images), printers (e.g., to translate an output image to paper or similar physical media), image pre-processing circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions thereof, or any other module, component, or technique as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
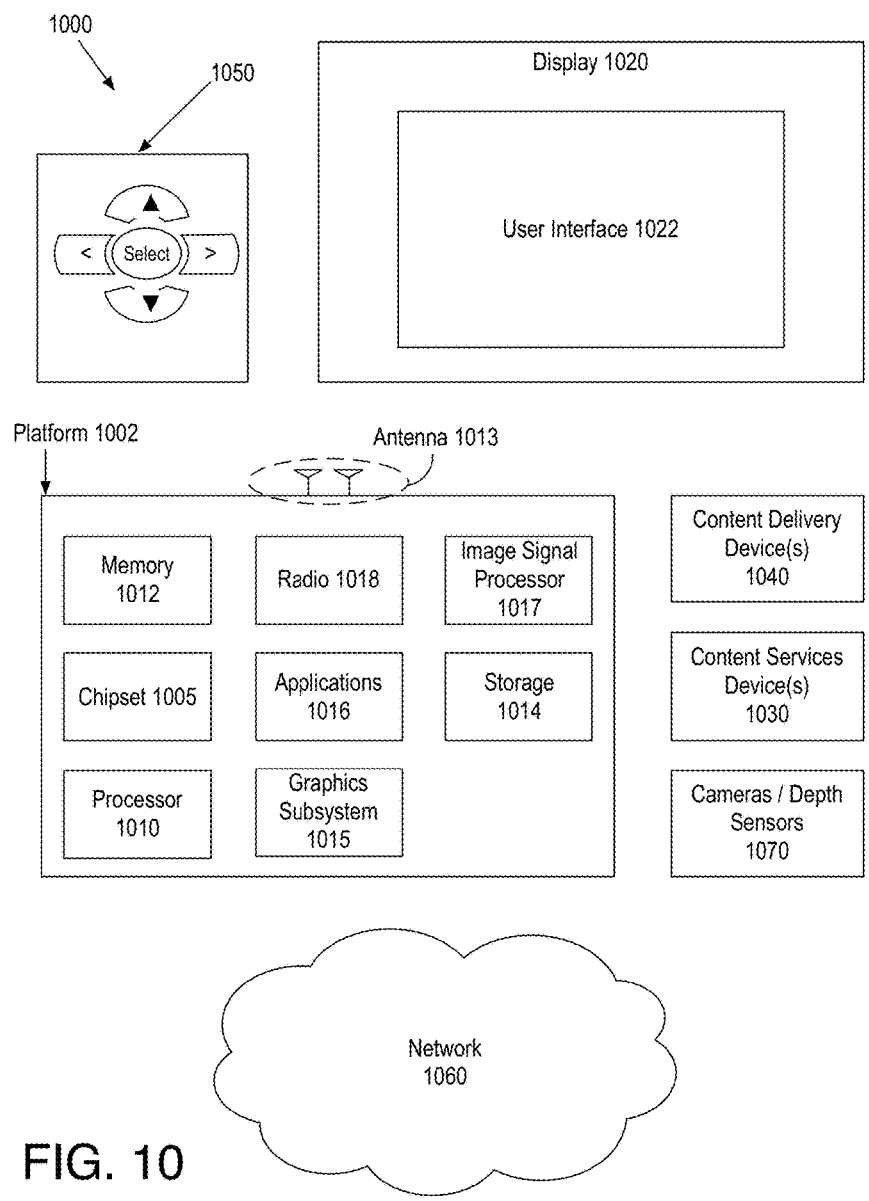
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1000 includes a platform 1002 coupled to a display 1020. Platform 1002 may receive content from a content device such as content services device(s) 1030 or content delivery device(s) 1040 or other content sources such as an image sensor 1019. For example, platform 1002 may receive raw image data from image sensor 1019 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Cameras/depth sensors 1070 may include color cameras (e.g., RGB cameras) for attaining images for stereoscopic imaging, disparity matching, or the like. Furthermore, cameras/depth sensors 1070 may include transmitters and/or depth sensors for generating rough depth and/or disparity maps as discussed herein. For example, cameras/depth sensors 1070 may include radar transmitters and sensors, IR transmitters and sensors, or the like.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020.

The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
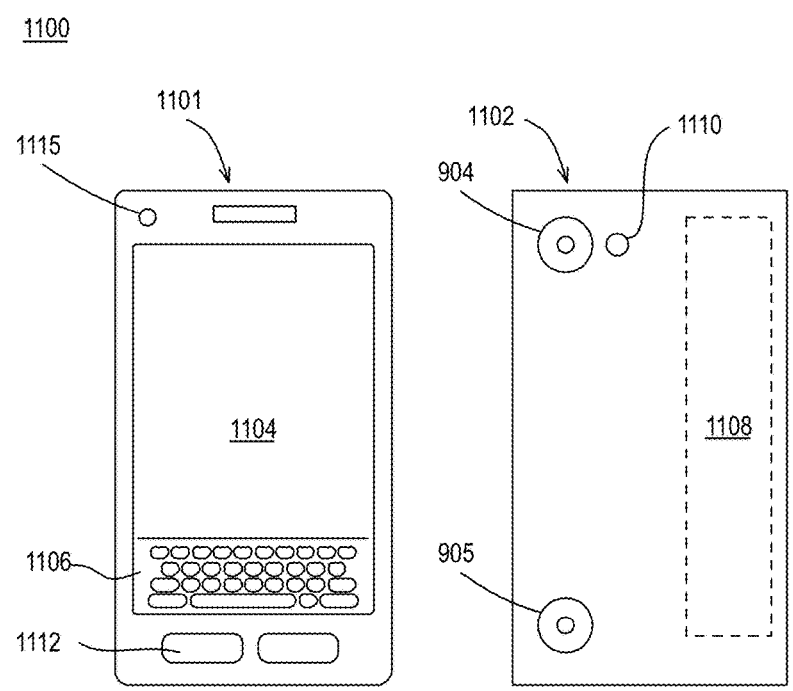
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, any devices or techniques or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include cameras 904, 905 (e.g., including lenses, apertures, and imaging sensors) and a flash 1110 integrated into back 1102 (or elsewhere) of device 1100 and a camera 1115 integrated into front 1101 of device 1100. Cameras 904, 904 and flash 1110 and/or camera 1115 may be components of a camera module to originate image data processed into streaming video that is output to display 1104 and/or communicated remotely from device 1100 via antenna 1108 for example. For example, cameras 904, 905 may attain images for generating a final disparity map as discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a system for approximate nearest neighbor searching comprises a memory configured to store an initial disparity map associated with two or more images, the initial disparity map comprising estimated disparity values for individual pixels of the initial disparity map and an image processor coupled to the memory, the image processor to generate, based on the initial disparity map, a search range for each of at least some of the individual pixels to provide a plurality of search ranges each comprising multiple disparity search values from an available search range, determine at least one combination of disparity search values that do not coexist in any of the search ranges, compress the combination of disparity values to a single disparity label, and perform a disparity estimation of the images based on a disparity search label set that comprises the single disparity label and has fewer members than the available search range.

Further to the first embodiments, the disparity estimation provides a lowest cost label from the disparity search label set for each of the individual pixels.

Further to the first embodiments, the image processor is further to generate a final disparity map based on the disparity estimation, wherein the image processor to generate the final disparity map comprises the image processor to, for a first pixel of the individual pixels, determine the single disparity label is the lowest cost label for the first pixel and to determine a first disparity value for the first pixel from a first or a second of the combination of disparity search values represented by the single disparity label based on the first or the second of the combination of disparity search values being within a first search range associated with the first pixel.

Further to the first embodiments, the disparity search label set comprises one or more of the multiple disparity search values from one or more of the search ranges.

Further to the first embodiments, the image processor to determine the combination of disparity search values comprises the image processor to generate a graph with a node for each of the disparity search values from the available search range to provide the graph with a plurality of nodes, to provide, for each of the individual pixels, edges among the nodes associated with the search range of the individual pixel, to color, for each of the individual pixels, the plurality of nodes to generate a plurality of colored graphs, and to combine nodes of the same color to generate one or more combinations of disparity search values that do not coexist in any of the search ranges.

Further to the first embodiments, the image processor is further to eliminate any disparity search values from the available search range that do not exist in any of the search ranges from inclusion in the disparity search label set.

Further to the first embodiments, the image processor to generate the search range for each of at least some of the individual pixels comprises the image processor to, for a first pixel of the individual pixels having a first estimated disparity value, generate a first search range for the first pixel from the first estimated disparity value minus an error tolerance range to the first estimated disparity value plus the error tolerance range.

Further to the first embodiments, the image processor to generate the search range for each of the individual pixels comprises, for a first pixel of the individual pixels, the image processor to add at least one disparity value from a pixel neighboring the first pixel.

Further to the first embodiments, the image processor to perform the disparity estimation of the images comprises the image processor to, for a first pixel of the individual pixels, determine whether a first or a second of the combination of disparity search values represented by the single disparity label is within a first search range associated with the first pixel and determine a cost of the single disparity label for the first pixel based on the first or second of the combination of disparity search values being within the first search range.

Further to the first embodiments, the image processor is further to generate the initial disparity map based on at least one of the image processor to estimate the initial disparity map based on a second disparity map associated with two or more second images temporally prior to the two or more images, the image processor to estimate low resolution disparity values based on downsampled versions of the images and upsample the low resolution disparity values to generate the estimated disparity values, the image processor to generate the initial disparity map via a depth sensor, or the image processor to generate the initial disparity based at least in part on predetermined information of a scene associated with the two or more images.

Further to the first embodiments, the available search range comprises a range of search values up to a maximum disparity value, and wherein the maximum disparity value is at least one of a predefined maximum disparity value or determined based on image content of at least one of the images.

In one or more second embodiments, a method for generating a disparity map comprises receiving an initial disparity map associated with two or more images, the initial disparity map comprising estimated disparity values for individual pixels of the initial disparity map, generating, based on the initial disparity map, a search range for each of at least some of the individual pixels to provide a plurality of search ranges each comprising multiple disparity search values from an available search range, determining at least one combination of disparity search values that do not coexist in any of the search ranges, compressing the combination of disparity values to a single disparity label, and performing a disparity estimation of the images based on a disparity search label set that comprises the single disparity label and has fewer members than the available search range.

Further to the second embodiments, the disparity estimation provides a lowest cost label from the disparity search label set for each of the individual pixels.

Further to the second embodiments, the method further comprises generating a final disparity map based on the disparity estimation, wherein generating the final disparity map comprises, for a first pixel of the individual pixels, determining the single disparity label is the lowest cost label for the first pixel and determining a first disparity value for the first pixel from a first or a second of the combination of disparity search values represented by the single disparity label based on the first or the second of the combination of disparity search values being within a first search range associated with the first pixel.

Further to the second embodiments, the disparity search label set comprises one or more of the multiple disparity search values from one or more of the search ranges.

Further to the second embodiments, determining the combination of disparity search values comprises generating a graph with a node for each of the disparity search values from the available search range to provide the graph with a plurality of nodes, providing, for each of the individual pixels, edges among the nodes associated with the search range of the individual pixel, coloring, for each of the individual pixels, the plurality of nodes to generate a plurality of colored graphs, coloring, for each of the individual pixels, the plurality of nodes to generate a plurality of colored graphs, and combining nodes of the same color to generate one or more combinations of disparity search values that do not coexist in any of the search ranges.

Further to the second embodiments, the method further comprises eliminating any disparity search values from the available search range that do not exist in any of the search ranges from inclusion in the disparity search label set.

Further to the second embodiments, generating the search range for each of at least some of the individual pixels comprises, for a first pixel of the individual pixels having a first estimated disparity value, generating a first search range for the first pixel from the first estimated disparity value minus an error tolerance range to the first estimated disparity value plus the error tolerance range.

Further to the second embodiments, generating the search range for each of the individual pixels comprises, for a first pixel of the individual pixels, adding at least one disparity value from a pixel neighboring the first pixel.

Further to the second embodiments, performing the disparity estimation of the images comprises, for a first pixel of the individual pixels, determining whether a first or a second of the combination of disparity search values represented by the single disparity label is within a first search range associated with the first pixel and determining a cost of the single disparity label for the first pixel based on the first or second of the combination of disparity search values being within the first search range.

Further to the second embodiments, the method further comprises generating the initial disparity map based on at least one of estimating the initial disparity map based on a second disparity map associated with two or more second images temporally prior to the two or more images, estimating low resolution disparity values based on downsampled versions of the images and upsampling the low resolution disparity values to generate the estimated disparity values, generating the initial disparity map via a depth sensor, or generating the initial disparity based at least in part on predetermined information of a scene associated with the two or more images.

Further to the second embodiments, the available search range comprises a range of search values up to a maximum disparity value, and wherein the maximum disparity value is at least one of a predefined maximum disparity value or determined based on image content of at least one of the images.

In one or more third embodiments, a system for generating a disparity map comprises means for receiving an initial disparity map associated with two or more images, the initial disparity map comprising estimated disparity values for individual pixels of the initial disparity map, means for generating, based on the initial disparity map, a search range for each of at least some of the individual pixels to provide a plurality of search ranges each comprising multiple disparity search values from an available search range, means for determining at least one combination of disparity search values that do not coexist in any of the search ranges, means for compressing the combination of disparity values to a single disparity label, and means for performing a disparity estimation of the images based on a disparity search label set that comprises the single disparity label and has fewer members than the available search range.

Further to the third embodiments, the disparity estimation provides a lowest cost label from the disparity search label set for each of the individual pixels.

Further to the third embodiments, the system further comprises means for generating a final disparity map based on the disparity estimation, wherein the means for generating the final disparity map comprise, for a first pixel of the individual pixels, means for determining the single disparity label is the lowest cost label for the first pixel and means for determining a first disparity value for the first pixel from a first or a second of the combination of disparity search values represented by the single disparity label based on the first or the second of the combination of disparity search values being within a first search range associated with the first pixel.

Further to the third embodiments, wherein the disparity search label set comprises one or more of the multiple disparity search values from one or more of the search ranges.

Further to the third embodiments, the means for determining the combination of disparity search values comprise means for generating a graph with a node for each of the disparity search values from the available search range to provide the graph with a plurality of nodes, means for providing, for each of the individual pixels, edges among the nodes associated with the search range of the individual pixel, means for coloring, for each of the individual pixels, the plurality of nodes to generate a plurality of colored graphs, and means for combining nodes of the same color to generate one or more combinations of disparity search values that do not coexist in any of the search ranges.

Further to the third embodiments, the system further comprises means for eliminating any disparity search values from the available search range that do not exist in any of the search ranges from inclusion in the disparity search label set.

Further to the third embodiments, the means for generating the search range for each of at least some of the individual pixels comprise, for a first pixel of the individual pixels having a first estimated disparity value, means for generating a first search range for the first pixel from the first estimated disparity value minus an error tolerance range to the first estimated disparity value plus the error tolerance range.

Further to the third embodiments, the means for generating the search range for each of the individual pixels comprise, for a first pixel of the individual pixels, means for adding at least one disparity value from a pixel neighboring the first pixel.

Further to the third embodiments, the means for performing the disparity estimation of the images comprise, for a first pixel of the individual pixels, means for determining whether a first or a second of the combination of disparity search values represented by the single disparity label is within a first search range associated with the first pixel and means for determining a cost of the single disparity label for the first pixel based on the first or second of the combination of disparity search values being within the first search range.

Further to the third embodiments, the system further comprises means for generating the initial disparity map based on at least one of means for estimating the initial disparity map based on a second disparity map associated with two or more second images temporally prior to the two or more images, means for estimating low resolution disparity values based on downsampled versions of the images and upsampling the low resolution disparity values to generate the estimated disparity values, means for generating the initial disparity map via a depth sensor, or means for generating the initial disparity based at least in part on predetermined information of a scene associated with the two or more images.

Further to the third embodiments, the available search range comprises a range of search values up to a maximum disparity value, and wherein the maximum disparity value is at least one of a predefined maximum disparity value or determined based on image content of at least one of the images.

In one or more fourth embodiments, at least one machine readable medium comprises a plurality of instructions that, in response to being executed on a device, cause the device to generate a disparity map by receiving an initial disparity map associated with two or more images, the initial disparity map comprising estimated disparity values for individual pixels of the initial disparity map, generating, based on the initial disparity map, a search range for each of at least some of the individual pixels to provide a plurality of search ranges each comprising multiple disparity search values from an available search range, determining at least one combination of disparity search values that do not coexist in any of the search ranges, compressing the combination of disparity values to a single disparity label, and performing a disparity estimation of the images based on a disparity search label set that comprises the single disparity label and has fewer members than the available search range.

Further to the fourth embodiments, the at least one machine readable medium comprises further instructions that, in response to being executed on the device, cause the device to generate a disparity map by generating a final disparity map based on the disparity estimation, wherein generating the final disparity map comprises, for a first pixel of the individual pixels, determining the single disparity label is the lowest cost label for the first pixel and determining a first disparity value for the first pixel from a first or a second of the combination of disparity search values represented by the single disparity label based on the first or the second of the combination of disparity search values being within a first search range associated with the first pixel.

Further to the fourth embodiments, the disparity search label set comprises one or more of the multiple disparity search values from one or more of the search ranges.

Further to the fourth embodiments, determining the combination of disparity search values comprises generating a graph with a node for each of the disparity search values from the available search range to provide the graph with a plurality of nodes, providing, for each of the individual pixels, edges among the nodes associated with the search range of the individual pixel, coloring, for each of the individual pixels, the plurality of nodes to generate a plurality of colored graphs, and combining nodes of the same color to generate one or more combinations of disparity search values that do not coexist in any of the search ranges.

Further to the fourth embodiments, the at least one machine readable medium comprises further instructions that, in response to being executed on the device, cause the device to generate a disparity map by eliminating any disparity search values from the available search range that do not exist in any of the search ranges from inclusion in the disparity search label set.

Further to the fourth embodiments, generating the search range for each of at least some of the individual pixels comprises, for a first pixel of the individual pixels having a first estimated disparity value, generating a first search range for the first pixel from the first estimated disparity value minus an error tolerance range to the first estimated disparity value plus the error tolerance range.

Further to the fourth embodiments, performing the disparity estimation of the images comprises, for a first pixel of the individual pixels, determining whether a first or a second of the combination of disparity search values represented by the single disparity label is within a first search range associated with the first pixel and determining a cost of the single disparity label for the first pixel based on the first or second of the combination of disparity search values being within the first search range.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for generating a disparity map comprising:
   receiving an initial disparity map associated with two or more images, the initial disparity map comprising estimated disparity values for individual pixels of the initial disparity map;
   generating, based on the initial disparity map, a search range for each of at least some of the individual pixels to provide a plurality of search ranges each comprising multiple disparity search values from an available search range;
   determining at least one combination of disparity search values that do not coexist in any of the search ranges;
   compressing the combination of disparity values to a single disparity label;
   performing a disparity estimation of the images based on a disparity search label set that comprises the single disparity label and has fewer members than the available search range; and
   outputting a final disparity map corresponding to the two or more images based on the disparity estimation.

2. The method of claim 1, wherein the disparity estimation provides a lowest cost label from the disparity search label set for each of the individual pixels.

3. The method of claim 1 further comprising:
   generating the final disparity map based on the disparity estimation, wherein generating the final disparity map comprises, for a first pixel of the individual pixels:
     determining the single disparity label is the lowest cost label for the first pixel; and
     determining a first disparity value for the first pixel from a first or a second of the combination of disparity search values represented by the single disparity label based on the first or the second of the combination of disparity search values being within a first search range associated with the first pixel.

4. The method of claim 1, wherein the disparity search label set comprises one or more of the multiple disparity search values from one or more of the search ranges.

5. The method of claim 1, wherein determining the combination of disparity search values comprises:
   generating a graph with a node for each of the disparity search values from the available search range to provide the graph with a plurality of nodes;
   providing, for each of the individual pixels, edges among the nodes associated with the search range of the individual pixel;
   coloring, for each of the individual pixels, the plurality of nodes to generate a plurality of colored graphs; and
   combining nodes of the same color to generate one or more combinations of disparity search values that do not coexist in any of the search ranges.

6. The method of claim 1, further comprising:
   eliminating any disparity search values from the available search range that do not exist in any of the search ranges from inclusion in the disparity search label set.

7. The method of claim 1, wherein generating the search range for each of at least some of the individual pixels comprises, for a first pixel of the individual pixels having a first estimated disparity value, generating a first search range for the first pixel from the first estimated disparity value minus an error tolerance range to the first estimated disparity value plus the error tolerance range.

8. The method of claim 1, wherein generating the search range for each of the individual pixels comprises, for a first pixel of the individual pixels, adding at least one disparity value from a pixel neighboring the first pixel.

9. The method of claim 1, wherein performing the disparity estimation of the images comprises, for a first pixel of the individual pixels:
   determining whether a first or a second of the combination of disparity search values represented by the single disparity label is within a first search range associated with the first pixel; and
   determining a cost of the single disparity label for the first pixel based on the first or second of the combination of disparity search values being within the first search range.

10. The method of claim 1, further comprising:
    generating the initial disparity map based on at least one of:
      estimating the initial disparity map based on a second disparity map associated with two or more second images temporally prior to the two or more images,
      estimating low resolution disparity values based on downsampled versions of the images and upsampling the low resolution disparity values to generate the estimated disparity values,
      generating the initial disparity map via a depth sensor, or
      generating the initial disparity based at least in part on predetermined information of a scene associated with the two or more images.

11. The method of claim 1, wherein the available search range comprises a range of search values up to a maximum disparity value, and wherein the maximum disparity value is at least one of a predefined maximum disparity value or determined based on image content of at least one of the images.

12. A system for approximate nearest neighbor searching comprising:
    a memory configured to store an initial disparity map associated with two or more images, the initial disparity map comprising estimated disparity values for individual pixels of the initial disparity map; and
    an image processor coupled to the memory, the image processor to generate, based on the initial disparity map, a search range for each of at least some of the individual pixels to provide a plurality of search ranges each comprising multiple disparity search values from an available search range, determine at least one combination of disparity search values that do not coexist in any of the search ranges, compress the combination of disparity values to a single disparity label, perform a disparity estimation of the images based on a disparity search label set that comprises the single disparity label and has fewer members than the available search range, and output a final disparity map corresponding to the two or more images based on the disparity estimation.

13. The system of claim 12, wherein the image processor is further to generate the final disparity map based on the disparity estimation, wherein the image processor to generate the final disparity map comprises the image processor to, for a first pixel of the individual pixels, determine the single disparity label is the lowest cost label for the first pixel and to determine a first disparity value for the first pixel from a first or a second of the combination of disparity search values represented by the single disparity label based on the first or the second of the combination of disparity search values being within a first search range associated with the first pixel.

14. The system of claim 12, wherein the disparity search label set comprises one or more of the multiple disparity search values from one or more of the search ranges.

15. The system of claim 12, wherein the image processor to determine the combination of disparity search values comprises the image processor to generate a graph with a node for each of the disparity search values from the available search range to provide the graph with a plurality of nodes, to provide, for each of the individual pixels, edges among the nodes associated with the search range of the individual pixel, to color, for each of the individual pixels, the plurality of nodes to generate a plurality of colored graphs, and to combine nodes of the same color to generate one or more combinations of disparity search values that do not coexist in any of the search ranges.

16. The system of claim 12, wherein the image processor is further to eliminate any disparity search values from the available search range that do not exist in any of the search ranges from inclusion in the disparity search label set.

17. The system of claim 12, wherein the image processor to generate the search range for each of at least some of the individual pixels comprises the image processor to, for a first pixel of the individual pixels having a first estimated disparity value, generate a first search range for the first pixel from the first estimated disparity value minus an error tolerance range to the first estimated disparity value plus the error tolerance range.

18. The system of claim 12, wherein the image processor to perform the disparity estimation of the images comprises the image processor to, for a first pixel of the individual pixels, determine whether a first or a second of the combination of disparity search values represented by the single disparity label is within a first search range associated with the first pixel and determine a cost of the single disparity label for the first pixel based on the first or second of the combination of disparity search values being within the first search range.

19. At least one non-transitory machine readable medium comprising a plurality of instructions that, in response to being executed on a device, cause the device to generate a disparity map by:
receiving an initial disparity map associated with two or more images, the initial disparity map comprising estimated disparity values for individual pixels of the initial disparity map;
generating, based on the initial disparity map, a search range for each of at least some of the individual pixels to provide a plurality of search ranges each comprising multiple disparity search values from an available search range;
determining at least one combination of disparity search values that do not coexist in any of the search ranges;
compressing the combination of disparity values to a single disparity label; and
performing a disparity estimation of the images based on a disparity search label set that comprises the single disparity label and has fewer members than the available search range.

20. The non-transitory machine readable medium of claim 19, further comprising instructions that, in response to being executed on the device, cause the device to generate a disparity map by:
generating the final disparity map based on the disparity estimation, wherein generating the final disparity map comprises, for a first pixel of the individual pixels:
determining the single disparity label is the lowest cost label for the first pixel; and
determining a first disparity value for the first pixel from a first or a second of the combination of disparity search values represented by the single disparity label based on the first or the second of the combination of disparity search values being within a first search range associated with the first pixel.

21. The non-transitory machine readable medium of claim 19, wherein the disparity search label set comprises one or more of the multiple disparity search values from one or more of the search ranges.

22. The non-transitory machine readable medium of claim 19, wherein determining the combination of disparity search values comprises:
generating a graph with a node for each of the disparity search values from the available search range to provide the graph with a plurality of nodes;
providing, for each of the individual pixels, edges among the nodes associated with the search range of the individual pixel;
coloring, for each of the individual pixels, the plurality of nodes to generate a plurality of colored graphs; and
combining nodes of the same color to generate one or more combinations of disparity search values that do not coexist in any of the search ranges.

23. The non-transitory machine readable medium of claim 19, further comprising instructions that, in response to being executed on the device, cause the device to generate a disparity map by:
eliminating any disparity search values from the available search range that do not exist in any of the search ranges from inclusion in the disparity search label set.

24. The non-transitory machine readable medium of claim 19, wherein generating the search range for each of at least some of the individual pixels comprises, for a first pixel of the individual pixels having a first estimated disparity value, generating a first search range for the first pixel from the first estimated disparity value minus an error tolerance range to the first estimated disparity value plus the error tolerance range.

25. The non-transitory machine readable medium of claim 19, wherein performing the disparity estimation of the images comprises, for a first pixel of the individual pixels:
determining whether a first or a second of the combination of disparity search values represented by the single disparity label is within a first search range associated with the first pixel; and
determining a cost of the single disparity label for the first pixel based on the first or second of the combination of disparity search values being within the first search range.

* * * * *